United States Patent [19]

Mizuno et al.

[11] Patent Number: 4,913,491
[45] Date of Patent: Apr. 3, 1990

[54] AUTOMOTIVE SEAT WITH SIDE SUPPORTS-MOUNTED SEATBACK

[75] Inventors: Shyozi Mizuno; Toru Kondo, both of Kanagawa, Japan

[73] Assignees: Ikeda Bussan Co., Ltd., Ayase; Nissan Shatai Company, Limited, Hiratsuka, both of Japan

[21] Appl. No.: 321,400

[22] Filed: Mar. 10, 1989

[30] Foreign Application Priority Data

Mar. 31, 1988 [JP] Japan .............................. 63-43901[U]

[51] Int. Cl.$^4$ .............................................. A47C 3/00
[52] U.S. Cl. ...................................... 297/284; 297/460; 297/464
[58] Field of Search ................ 297/284, 460, 464, 486

[56] References Cited

U.S. PATENT DOCUMENTS

| | | | |
|---|---|---|---|
| 3,773,382 | 11/1973 | Coursault et al. | 297/284 |
| 4,130,318 | 12/1978 | Hemmen et al. | 297/391 |
| 4,370,000 | 1/1983 | Kazaoka et al. | 297/284 |
| 4,500,136 | 2/1985 | Murphy | 297/284 |
| 4,537,444 | 8/1985 | Maruyama et al. | 297/284 |
| 4,636,000 | 1/1987 | Nishino | 297/284 |
| 4,697,848 | 10/1987 | Hattori et al. | 297/284 |

FOREIGN PATENT DOCUMENTS

| | | |
|---|---|---|
| 2316694 | 10/1974 | Fed. Rep. of Germany . |
| 2706097 | 7/1978 | Fed. Rep. of Germany . |
| 1512028 | 5/1978 | United Kingdom . |

Primary Examiner—Francis K. Zugel
Attorney, Agent, or Firm—Foley & Lardner, Schwartz, Jeffery, Schwaab, Mack, Blumenthal & Evans

[57] ABSTRACT

Herein disclosed is an automotive seat which comprises a seatback proper; and a pair of side supports which are pivotally connected through respective pivot shafts to both sides of the seatback proper, each side support including a front surface which extends in a given direction. The thickness of each side support gradually decreases with increase of height of the same, and each pivot shaft extends substantially in the given direction.

9 Claims, 2 Drawing Sheets

2

AUTOMOTIVE SEAT WITH SIDE SUPPORTS-MOUNTED SEATBACK

BACKGROUND OF THE INVENTION

1. Field of the Invention

The present invention relates in general to automotive seats and, more particularly, to automotive seats of a type which is equipped at both side of a seatback thereof with pivotal side supports.

2. Description of the Prior Art

In order to clarify the task of the present invention, two conventional automotive seats of the above-mentioned type will be outlined with reference to FIGS. 6 to 9 of the accompanying drawings.

In FIGS. 6 and 7, there is shown a seatback of one conventional seat, which comprises a seatback proper 100, a headrest 200 mounted on the seatback proper 100 in a known manner, and side supports 1a and 1b pivotally connected to respective side portions of the seatback proper 100. Each side support 1a or 1b has a pivoting axis 2a or 2b about which the same is pivotal relative to the seatback proper 100. As is seen from FIG. 7, the thickness of each side support 1a or 1b gradually decreases with increase of height of the same. Designated by numeral 3 is a front surface of the side support 1a or 1b, which is thus inclined with respect to the pivoting axis 2a or 2b. Designated by reference "D" is an imaginary axis which is perpendicular to an upper surface of a seat cushion 300. Upon proper sitting of a person on the seat, the axis of the body of the person coincides with the imaginary axis "D".

In FIGS. 8 and 9, there is shown a seatback of the other conventional seat, which, similar to the above-mentioned one, comprises a seatback proper 100, a headrest 200, and side supports 5a and 5b. As is seen from FIG. 8, the side supports 5a and 5b are so arranged that their respective pivoting axes 6a and 6b are inclined relative to the imaginary axis "D". That is, the distance "L" between the two axes 6a and 6b gradually decreases with increase of height of them.

However, due to their inherent constructions, the above-mentioned two seatbacks have the following drawbacks.

That is, in the former one, even when the side supports 1a and 1b are raised to assume their operative or holding positions, the upper portion of each side support 1a or 1b fails to achieve a sufficient holding performance because of a considerable distance which is inevitably remained between the upper portion of the side support 1a or 1b and the axis "D" of the seat occupant's body.

In the latter one, a sufficient holding performance of the upper portion of each side support 1a or 1b is obtained. However, the upper portions of the side supports 1a and 1b tend to apply the seat occupant with uncomfortable pressure because of a shortened distance which is inevitably remained between the upper portion of the side support 5a or 6a and the axis "D" of the seat occupant's body.

SUMMARY OF THE INVENTION

It is therefore an object of the present invention to provide a side supports-mounted seatback which is free of the above-mentioned drawbacks.

According to the present invention, there is provided an automotive seat which is equipped at a seatback thereof with pivotal side supports. Each side support can pivot about its pivotal shaft toward its operative or holding position without applying a seat occupant with partially intensified uncomfortable pressure.

According to the present invention, there is provided an automotive seat which comprises a seatback proper; and a pair of side supports which are pivotally connected through respective pivot shafts to both sides of the seatback proper, each side support including a front surface which extends in a given direction; wherein the thickness of each side support gradually decreases with increase of height of the same, and each pivot shaft extends substantially in the given direction.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
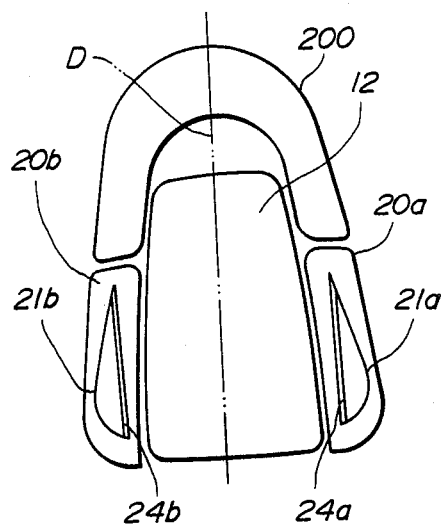
FIG. 1 is a schematically illustrated front view of a side supports-mounted seatback according to the present invention.
Figure 2:
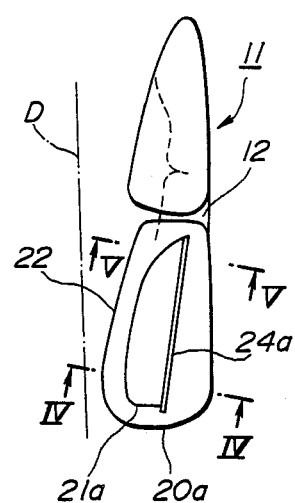
FIG. 2 is a side view of the seatback of the invention.

Referring to FIGS. 1 and 2, there is shown a seatback 11 according to the present invention. Although not shown in the drawings, the seatback 11 is mounted on a seat cushion through a known reclining mechanism.

The seatback 11 comprises a seatback proper 12, a headrest 200 mounted on the seatback proper 12 in a known manner and a pair of side supports 20a and 20b pivotally mounted to side portions of the seatback proper 12 in an after-mentioned manner.

The seatback proper 12 comprises a rectangularly extending frame which constitutes a structural base of the seatback proper and includes an upper part (not shown), two side parts 13a and 13b and a lower part 14. Although not shown in the drawings, a plurality of wire springs expand between the side parts 13a and 13b, a suitable pad member is mounted on the wire springs and the frame, and an outer skin member covers pad member.

Figure 3:
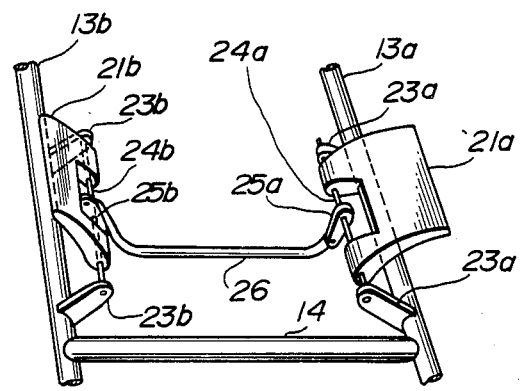
FIG. 3 is a perspective view of a pivoting mechanism employed in the seatback of the present invention.

The side supports 20a and 20b are pivotally connected to the side parts 13a and 13b of the frame through a pivoting mechanism which is clearly shown in FIG. 3.

As is seen from FIG. 3, the pivoting mechanism comprises substantially identical two groups of parts which are respectively mounted to the side parts 13a and 13b of the frame.

Each group comprises two spaced brackets 23a and 23a (23b and 23b) secured to the side part 13a (13b), and a smoothly curved wing 21a (21b) pivotally connected to the brackets 23a and 23a(23b and 23b) through a pivot shaft 24a (24b). That is, the wing and the pivot shaft are secured to each other thereby to pivot together relative to the brackets. As shown, the wing 21a (21b) has at its inboard side a recess (no numeral) to which a middle portion of the pivot shaft 24a (24b) is exposed.

In order to move the two wings 21a and 21b simultaneously, the pivoting mechanism further comprises a transmission bar 26 which has both ends connected through respective arms 25a and 25b to the pivot shafts 24a and 24b. More specifically, the arms 25a and 25b are secured at their one ends to the corresponding pivot shafts 24a and 24b and extend in the opposite direction from the pivot shafts 24a and 24b. The leading end of each arm 25a or 25b is pivotally connected to the corresponding end of the transmission bar 26. Although not shown in the drawings, an operating handle is mounted to a given portion of the frame 14 to move the bar 26 along the axis thereof. Thus, when, due to manipulation of the operating handle, the bar 26 is moved rightward in the drawing, the right wing 21a pivots counterclockwise and the left wing 21b pivots clockwise. While, when the bar 26 is moved leftward, the wings 21a and 21b pivot in the opposite directions. Thus, upon manipulation of the operating handle, the two wings 21a and 21b move like gull wings having their free ends moved toward and away from each other.

Each wing 21a or 21b is covered with a suitable pad to constitute a pillow like structure. As is seen from FIG. 2, the thickness of each structure (viz., the side support 20a or 20b) gradually decreases with increase of height of the same.

As is seen from FIGS. 1 and 3, the pivot shafts 24a and 24b are substantially in parallel with the the axis "D" which is perpendicular to the upper surface of the seat cushion (not shown). Furthermore, as is seen from FIG. 2, the pivot shafts 24a and 24b are substantially in parallel with the front surfaces 22 and 22 of the respective side supports 20a and 20b.

Because of the arrangments as described hereinabove, the pivotal movement of each side support 20a and 20b about the pivot shaft 24a or 24b toward the holding position causes both the upper and lower portions of the side support to exhibit identical holding performance without applying the side body of the seat occupant with partially intensified uncomfortable pressure.

Figure 4:
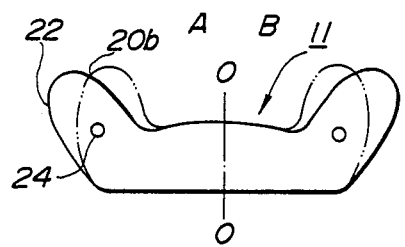
FIG. 4 is a sectional view taken along the line IV—IV of FIG. 2.
Figure 5:
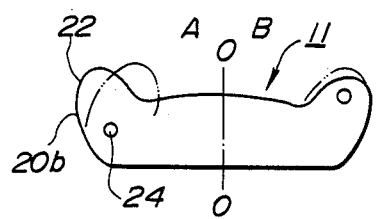
FIG. 5 is a sectional view taken along the line V—V of FIG. 2.
Figure 6:
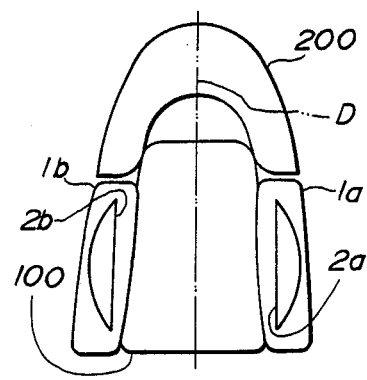
FIG. 6 is a front view of one conventional side supports-mounted seatback.
Figure 7:
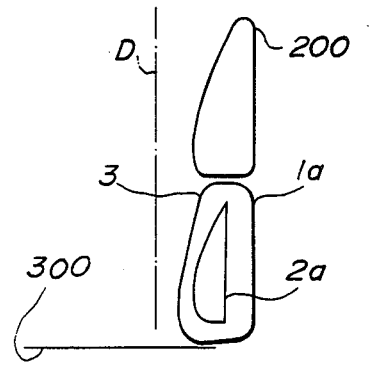
FIG. 7 is a side view of the conventional seatback.
Figure 8:
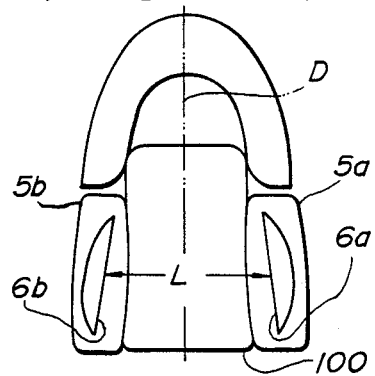
FIG. 8 is a front view of the other conventional side supports-mounted seatback.
Figure 9:
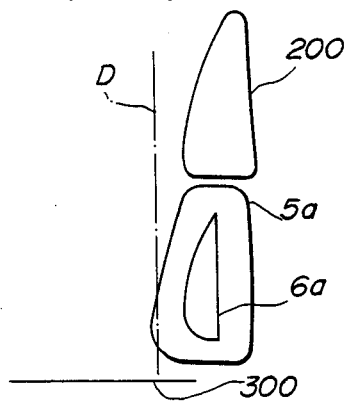
FIG. 9 is a side view of the other conventional seatback.

This advantageous phenomenon will be easily understood from FIGS. 4 and 5 which are sectional views of the lower and upper portions of the seatback taken along the lines IV—IV and V—V of FIG. 2.

In FIGS. 4 and 5, the leftside illustrations denoted by reference "A" show the case of the invention, while the rightside illustrations denoted by reference "B" show the case of a conventional device. The solid lines in the drawings show a condition wherein the side support assumes its rest position, while the phantom lines show a condition wherein the side support assumes its operative or holding position.

As is seen from FIG. 4, in the lower portion of the side support, there is substantially no difference in the holding performance between invention and the conventional one. However, as is seen from FIG. 5, in the upper portion of the side support, there is a considerable difference between them. That is, in the invention, there is exhibited a sufficient raising at the upper portion of the side support. While, in the conventional one, the raising is quite small.

What is claimed is:

1. An automotive seat comprising:
   a seatback proper; and
   a pair of side supports which are pivotally connected through respective pivot shafts to both sides of said setback proper, each side support including an elongate front surface whose longitudinal axis extends in a given direction, said side supports being arranged in such a manner that the distance therebetween gradually decreases with increase of heights of the side supports,
   wherein the thickness of each side support gradually decreases with increase of height of the same, each pivot shaft extends in a direction substantially in parallel with said given direction, and said pivot shafts extend in parallel with each other.

2. An automotive seat as claimed in claim 1, in which each of said pivot shafts inclines with respect to an imaginary axis which extends perpendicular to an upper surface of a seat cushion which is adapted to be combined with said seatback proper.

3. An automotive seat as claimed in claim 2, in which said imaginary axis is likely to become an axis which coincides with the axis of the body of a seat occupant who is properly sitting on said seat.

4. An automotive seat as claimed in claim 1, in which said seatback proper comprises a rectangularly extending frame including opposed side parts.

5. An automotive seat as claimed in claim 4, in which said pair of side supports are pivotally connected to said opposed side parts of said frame respectively through a pivotal mechanism.

6. An automotive seat as claimed in claim 5, in which said pivoting mechanism comprises two groups of parts which are respectively mounted to said opposed side parts of the frame respectively.

7. An automotive seat as claimed in claim 6, in which each group comprises:
   two spaced brackets secured to one of the opposed side parts of the frame;
   a wing;
   a pivot shaft secured to said wing and pivotally connected to said two spaced brackets, so that said wing pivots together with said pivot shaft relative to said two brackets.

8. An automotive seat as claimed in claim 7, further comprising a simultaneously transmitting mechanism by which said two groups of parts operate simultaneously.

9. An automotive seat as claimed in claim 8, in which said simultaneously transmitting mechanism comprises:
   two arms which have respective ends secured to the pivot shafts of the respective two groups and extend in opposite directions; and
   a transmitting bar having both ends respectively and pivotally connected to leading ends of said two arms.

* * * * *